3,045,351
MOUNT FOR TELESCOPE SIGHTS
Theodore S. Dayton, 5030 SW. Oleson Road,
Portland 19, Oreg.
Filed July 21, 1959, Ser. No. 828,608
9 Claims. (Cl. 33—50)

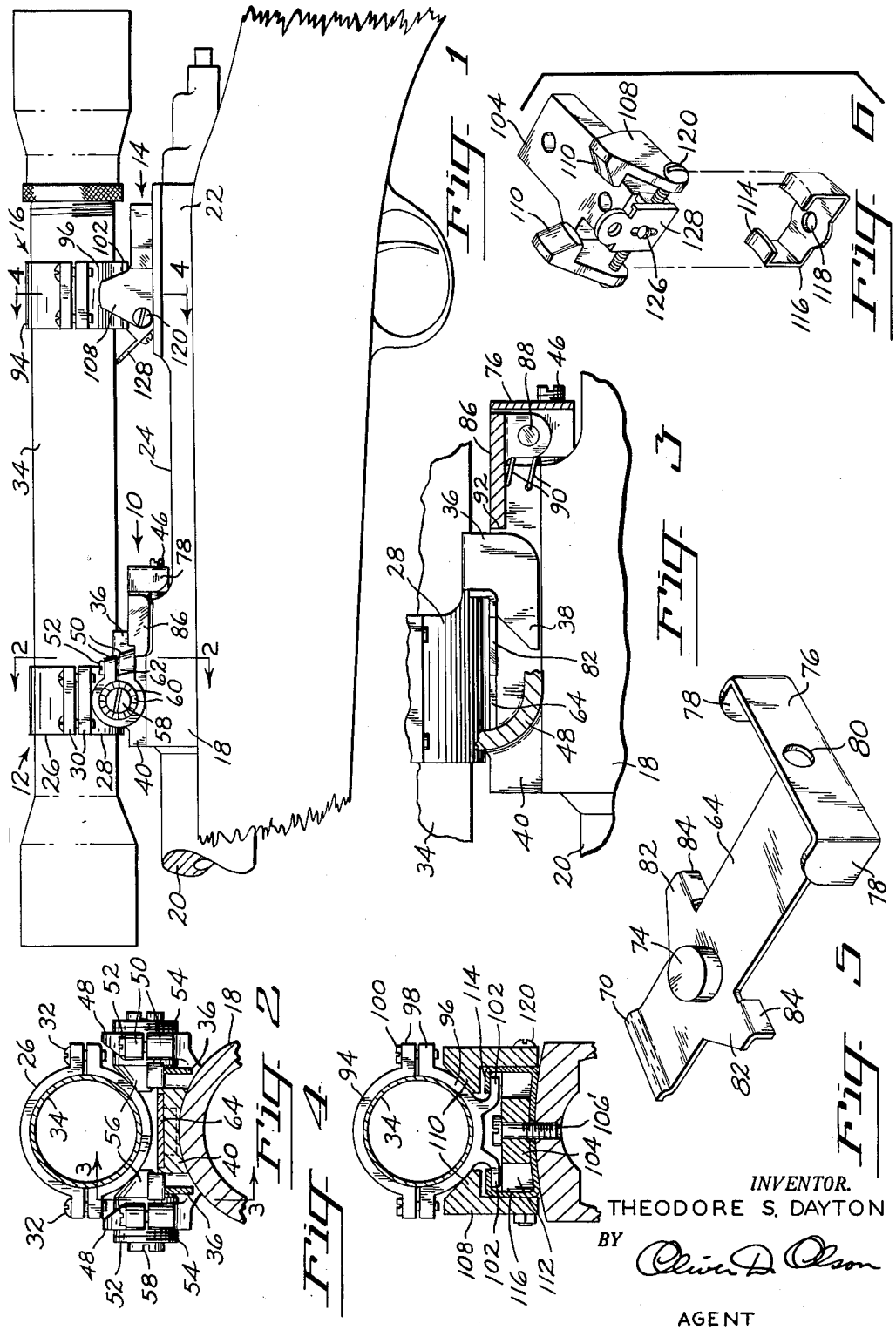
July 24, 1962     T. S. DAYTON     3,045,351
MOUNT FOR TELESCOPE SIGHTS
Filed July 21, 1959     2 Sheets-Sheet 1
INVENTOR.
THEODORE S. DAYTON
BY
AGENT July 24, 1962     T. S. DAYTON     3,045,351
MOUNT FOR TELESCOPE SIGHTS
Filed July 21, 1959     2 Sheets-Sheet 2
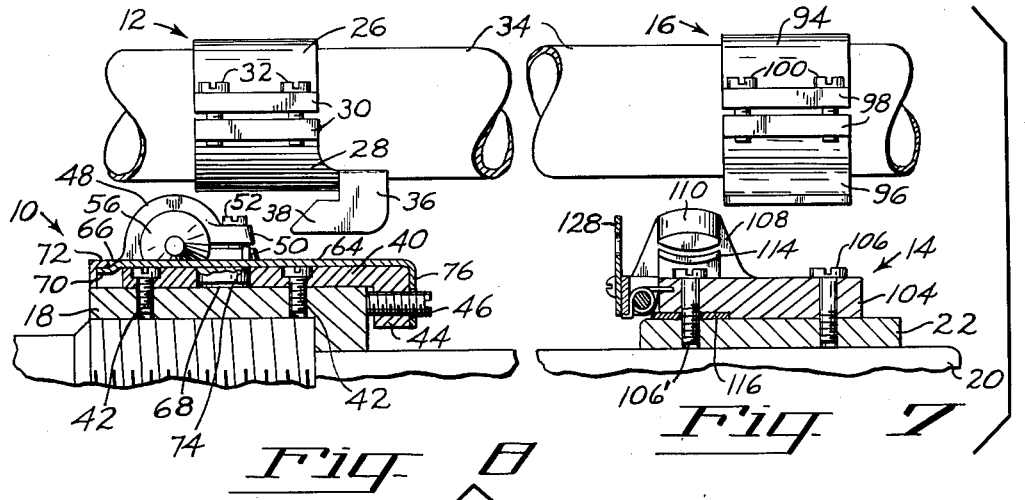
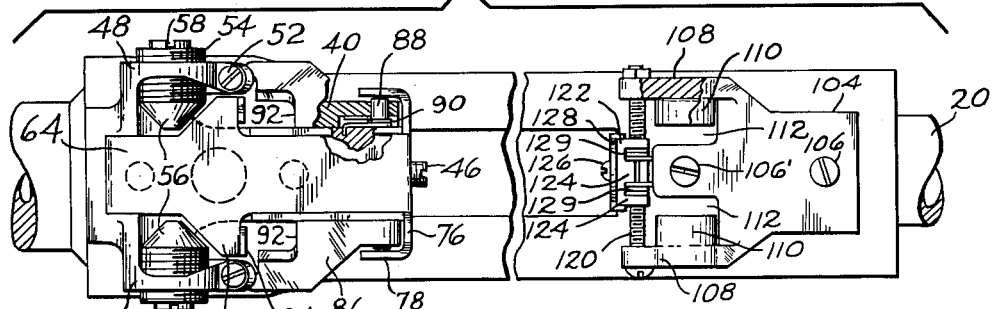
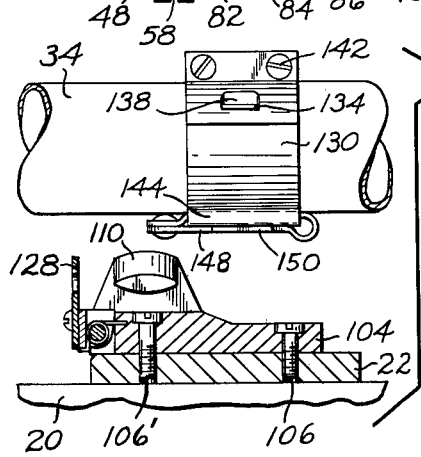
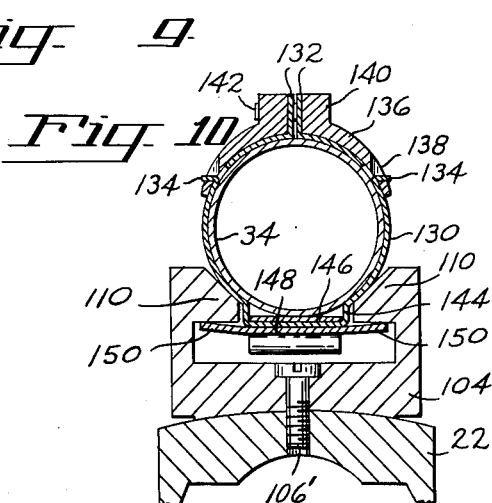
INVENTOR.
THEODORE S. DAYTON
BY Oliver D. Olson
AGENT

United States Patent Office 3,045,351
Patented July 24, 1962

This invention pertains to the mounting of telescope sights on guns, and relates particularly to a telescope gun sight mount which achieves the following important objectives: It is readily attachable to standard rifles and accommodates mounting of the great majority of popular telescope sights, including those with adjustable reticles. It provides for the mounting of a telescope sight with a minimum of distance between the telescope and the rifle bore, without obstructing the loading area of the rifle receiver. It also accommodates correction of cant in the telescope sight while the latter is mounted on the rifle, thus avoiding the trial and error method of squaring up the reticles as is required with mounts of the prior art.

The mount of this invention also provides for attachment and detachment of a telescope sight with speed and facility, and yet provides for maximum stability when attached. Repeated detachment and attachment of the telescope sight does not destroy the zero setting, nor does recoil during firing.

The mount of this invention also provides for complete adjustment for windage and elevation with precision and facility and with the telescope sight installed. These adjustments are accommodated without rotation of the telescope sight, thus maintaining the reticles in properly squared condition and without imposing longitudinal stress on the sight.

In addition, the mount of this invention includes an auxiliary peep sight which raises automatically to operative position when the telescope sight is removed.

The foregoing objectives are achieved, moreover, by the provision of a mount which is of simplified construction for economical manufacture.

The foregoing and other objects and advantages of this invention will appear from the following detailed description, taken in connection with the accompanying drawings in which:

FIG. 1 is a fragmentary view in side elevation showing a telescope sight mounted on a rifle by means of a mount embodying the features of the present invention;

FIG. 2 is a fragmentary sectional view taken along the line 2—2 in FIG. 1 and showing details of construction of the front mount;

FIG. 3 is a fragmentary sectional view taken along the line 3—3 in FIG. 2;

FIG. 4 is a fragmentary sectional view taken along the line 4—4 in FIG. 1 and showing details of construction of the rear mount;

FIG. 5 is a perspective view of the forward mount spring, the same being shown inverted from its normal condition of assembly;

FIG. 6 is an exploded perspective view illustrating the manner of assembly of components of the rear mount;

FIG. 7 is a fragmentary foreshortened view in side elevation, partly in section, showing the arrangement of parts with the telescope sight detached from the mount bases;

FIG. 8 is a fragmentary foreshortened plan view, partly in section, of the mount bases, as viewed from the top in FIG. 7 with the telescope sight removed from view;

FIG. 9 is a fragmentary view in side elevation, partly in section, showing a modified form of rear mount, the arrangement of parts being shown with the telescope sight detached;

FIG. 10 is a fragmentary sectional view showing the arrangement of parts of the modified form of rear mount of FIG. 9, in condition of attachment; and FIG. 11 is a fragmentary bottom plan view of the telescope sight rear ring clamp, as viewed in the direction of the arrow in FIG. 9.

The mount assembly of this invention comprises a front mount which includes a base section 10 and a telescope clamp section 12, and a rear mount which includes a base section 14 and a telescope clamp section 16. As best shown in FIG. 1, the front mount is positioned on the receiver ring 18 of a rifle 20 and the rear mount is positioned on the bridge 22, whereby the telescope sight spans the loading area 24 a spaced distance above the latter.

The front telescope clamp section 12 includes a pair of substantially semi-circular ring segments 26 and 28, the adjacent edges of which are provided with outwardly projecting flanges 30. The adjacent flanges are provided with axially aligned holes, at least the lower of which is threaded to receive the securing screw 32 for tightening the ring segments about a telescope body 34.

The lower ring segment 28 is provided with a base connecting section which includes a pair of laterally spaced downwardly projecting legs 36. These legs terminate at their lower ends in forwardly projecting shoes 38. The front end of each shoe is inclined downwardly in the forward direction to guide the connecting section into attachment with the base section 10 as explained more fully hereinafter.

The base section 10 of the front mount includes a base member 40 adapted to seat upon the receiver ring 18 and to be secured thereto by means of the screws 42 which extend through openings in the base member for reception in the tapped openings in the receiver ring. The rear end of the base member is provided with a downwardly projecting flange 44, and this flange is provided with a tapped opening for the abutment screw 46. This screw functions by abutment against the rear end of the receiver ring to accommodate mounting of the front sight on rifles having receiver rings of various dimensions. The screw also functions by abutment against the rear end of the receiver ring to transfer the forces of recoil directly to the receiver ring, thus minimizing the forces tending to shear the mounting screws 42.

A pair of laterally spaced upstanding brackets 48 project from the lateral sides of the base member 40. These brackets are provided with axially aligned threaded bores, and each bracket preferably is split radially and provided with radially projecting flanges 50 adjacent the split. Adjacent flanges are provided with axially aligned bores, one of which is threaded to receive the clamping screw 52.

The threaded bore of each bracket is adapted to receive the threaded mounting bearing 54. The inner end 56 of this bearing is substantially conical in shape, tapering inwardly to its truncated apex. The outer end of the bearing is provided with a screw driver slot 58, preferably of sufficient dimension to receive a small coin, for purposes of rotating the bearing.

The outer end of each bearing also preferably is provided with circumferentially spaced graduations 60, and these are related to an index mark on the bracket 48. In the embodiment illustrated, the index mark is provided by the radial slit 62. As explained more fully hereinafter, the graduations preferably are calibrated in terms of minutes of angle of elevation and azimuth. The clamping screws 52 serve to secure the bearing in position of adjustment.

The front base member supports a mounting spring 64 (FIG. 5), and to this end is provided with a lateral slot 66 adjacent its forward end and a central opening 68 intermediate its ends. The spring comprises an elongated body, the forward section 70 of which is offset downwardly to engage under the lip 72 provided by the transverse slot 66. Intermediate the ends of the spring body is secured a downwardly projecting post 74 proportioned and arranged to be received within the central opening 68 in the base member. The rear end of the spring body is formed with a downwardly projecting section 76 which is somewhat wider than the elongated body and which terminates at its opposite lateral ends in forwardly projecting tabs 78. The rear end section 76 of the spring body is provided with an aperture 80 proportioned to receive the abutment screw 46 freely therethrough.

Intermediate the ends of the elongated spring body there is also provided a pair of laterally extending arms 82, the rearward end portions 84 of which are turned upward. These upturned ends cooperate with a pair of locking pieces 86 which are mounted pivotally at their rearward ends on studs 88 which project laterally from the base member 40. These locking pieces are retained on the studs by confining them between the base member and the forwardly projecting tabs 78 on the rear end section of the spring 64. Each locking piece is urged upward at its forward end, i.e., clockwise rotation in FIG. 3, by means of a coil spring 90 which encircles the stud. One end of the coil spring engages under the locking piece and the other end of the coil spring is secured in a hole provided in the base member 40 (FIG. 8). Upward movement of the locking piece is limited by abutment at its forward end against the under side of the flange 50. Each locking piece is notched intermediate its ends to provide a laterally extending edge 92 which is spaced rearwardly from the upturned ends 84 of the spring arms 82. The space between this edge and arm is proportioned to receive the downwardly projecting leg 36 of the front clamp section 12, with the forwardly projecting shoe 38 engaging under the spring arm 82. In this position the elevated locking piece prevents rearward movement of the clamp section and thus locks the latter to the front base section.

The clamp section 16 of the rear mount also includes a pair of substantially semi-circular segments 94, 96 releasably secured together at their adjacent flanges 98 by means of the attaching screws 100, in manner similar to the construction of the front clamp section.

The bottom ring segment 96 is formed with a pair of laterally extending ears 102 which project downwardly and outwardly from the underside of the bottom ring segment.

The rear base section includes a base member 104 provided with a pair of transverse openings aligned axially with threaded openings in the rifle bridge 22, for attachment of the base member to the bridge by means of the screws 106, 106'. Projecting upwardly from the lateral sides of the base member is a pair of brackets 108. Mounted upon each of the brackets and preferably formed integral therewith, is an inwardly directed bearing section 110 having its upper and lower surfaces formed as segments of a cylinder. Thus, these surfaces are arcuately convex in the longitudinal direction of the base member. The upper surface inclines downwardly toward the longitudinal centerline of the base member.

The underside of each bearing section is disposed a spaced distance above the base member, and an opening 112 is provided in the latter vertically below the section. These laterally spaced openings are proportioned to receive freely therethrough the inturned arms 114 of the channel shaped spring member 116 (FIG. 6). These inturned arms are positioned a spaced distance below the under surface of the bearing section when the closed end of the spring is in abutment with the underside of the base member 104 (FIG. 4). An opening 118 in the closed end of the spring receives freely therethrough the forward attaching screw 106'.

The inturned arms 114 of the spring preferably are arcuately concave in the longitudinal direction of the base member, and function to receive under them the laterally projecting ears 102 of the bottom segment 96 of the rear clamp section. Thus, by engagement of these ears with the inturned arms, the resilient spring urges the bottom segement of the clamp member into firm seating engagement with the upper arcuate surfaces of the mounting bearings 110 (FIG. 4).

In the preferred embodiment illustrated, a laterally extending screw 120 is supported rotatably adjacent its ends in the forward ends of brackets 108. A bracket 122 is provided with three laterally spaced bearing extensions 124. These extensions are provided with axially aligned transverse openings, and the opening in the central extension is threaded to receive the screw 120. In this manner the bracket is adjustable laterally along the screw by rotation of the latter. The central extension also is split radially from the threaded opening, and this split is traversed by a clamping screw 126 which is received in a threaded opening in the split sections of the extension. The bracket thus may be secured firmly to the screw 120 in any position of lateral adjustment. The bracket 122 supports a rear peep sight member 128 which is slotted vertically to receive the clamping screw 126, whereby to render the sight member vertically adjustable. A pair of coil springs 129 encircle the screw 120, one between the central extension and each end extension, with the ends of each spring engaging the base member 104 and bracket 122, respectively. The springs thus urge the peep sight member resiliently toward its upright position (FIG. 9).

In the modified form of rear mount illustrated in FIGS. 9, 10 and 11, the clamp section includes a substantially circular split resilient ring 130, the split ends 132 being turned radially outward. Opposed segments of the ring are struck outwardly to provide a pair of laterally projecting ears 134. A pair of clamping jaws 136 are provided with an arcuate under surface conforming to the curvature of the resilient ring. An opening 138 is formed adjacent the lower end of each jaw to receive the outwardly struck ear 134, and the upper end of each jaw is provided with an upwardly extending flange 140 which engages the upwardly turned split ends of the ring. The pair of jaws thus are arranged in opposed relation, and the flanges and upturned split ends of the ring are provided with axially aligned openings to receive the attaching screws 142. For this purpose, at least one of the flange openings is threaded.

A segment 144 of the underside of the resilient ring 130 is offset downwardly, and this segment is interposed between the upper section 146 and lower section 148 of a spring member. The spring member is formed by bending a length of metal intermediate its ends and securing the terminal ends together by means of the rivet illustrated.

The lower section 148 of the spring member is provided with a pair of laterally extending arms 150 which are bent slightly upward (FIG. 10). These arms are adapted to slidably engage the arcuate under surface of the inwardly projecting mounting bearings 110, the resilience of the spring thus drawing the clamp ring firmly into engagement with the upper arcuate surfaces of the bearings.

The installation and operation of the mount assembly described hereinbefore is as follows: The front and rear base members are attached to the receiver ring and bridge, respectively, of a rifle, as previously described. The bottom segment 28 of the front clamp section then is mounted upon the front base section 10, as follows: The bottom edges of the shoes 38 are placed upon the locking pieces 86, with the front ends of the shoes engaging the upturned ends 84 of the lateral arms 82 of the spring member 64. By pressing downward and forward on the bottom segment 28 of the front clamp section, the locking pieces are caused to rotate counterclockwise (FIG. 3) about the studs 88, thus permitting the forwardly projecting shoes to be pushed under the lateral arms of the spring. The locking pieces thereupon rotate clockwise under the influence of the coil spring 90, to lock the bottom segment of the front clamp section firmly to the base section against relative longitudinal displacement. The resilience of the spring member 64 functions to draw the bottom segment of the front clamp section downward into firm seating engagement with the laterally spaced conical ends 56 of the mounting bearings 54.

The rear clamp section 16 then is mounted upon the rear base section 14. Thus, in the embodiment illustrated in FIGS. 1–8, the bottom segment 96 is placed to the rear of the mounting bearings 110 and pushed forwardly until the laterally projecting ears 102 are centered under the inturned arms 114 of the spring 116, the bottom segment thus being seated firmly on the arcuate segments of the mounting bearings.

The barrel of the telescope sight 34 then is placed upon the inner arcuate surfaces of the bottom segments of the front and rear clamp sections, and the upper ring segments are then mounted in place but left sufficiently loose to permit longitudinal movement and axial rotation of the telescope sight. The reticles then may be squared and the scope adjusted to zero on the rifle, after which the clamp sections are tightened.

In the modification illustrated in FIGS. 9–11, the resilient ring 130 and its attached spring member first is mounted loosely on the telescope sight, and then is pushed forwardly until the lateral arms 150 of the spring are centered on the under surface of the bearing segments 110, the ring thus being seated firmly on the upper surfaces of the mounting bearings.

It is to be noted from FIG. 1 that when the telescope sight is mounted upon the rifle, the barrel of the sight engages the auxiliary peep sight member 128 and holds the latter in the retracted position against the compression of its return springs 129.

To remove the telescope sight from the mount bases, the hand is cradled around the rifle stock and the locking finger pieces 86 rotated counterclockwise, by two fingers of the hand. The other hand then grasps the rear end of the telescope sight, with the thumb engaging the rear base member to provide a rearward force sufficient to draw the clamp sections rearward from their mounting bearings.

Upon removal of a telescope sight from the base sections, the auxiliary peep sight automatically rotates clockwise (FIG. 1), under the influence of its spring, to the operative position convenient for use with the fixed front sight on the forward end of the rifle barrel.

To reinstall the telescope sight upon the rifle after the clamp sections have been secured firmly in place, the telescope and clamp assembly is placed upon the front and rear base members and, with slight downward pressure, moved forwardly. The auxiliary peep sight thereupon is rotated counterclockwise to its retracted position, the locking pieces also rotated counterclockwise, and the front and rear clamp sections secured firmly on the mounting bearings as described hereinbefore.

Variations in elevation are achieved by rotating the cone bearings 54 on the front base member, through equal degrees of rotation in the directions to move them equal distances toward or away from the longitudinal center line of the front base member 40. This is facilitated by use of the graduations 60, as described hereinbefore. This movement in elevation is accommodated by the front spring member and by the resilience of the rear mount spring and curvature of the rear mount bearings.

Variations in azimuth are achieved by rotating the front cone bearings through equal degrees of rotation in the directions to shift the midpoint between the bearings laterally with respect to the longitudinal axis of the front base member. The calibrations on the bearings serve to facilitate this adjustment, in the same manner as the adjustments in elevation described hereinbefore. The range of azimuth adjustments is accommodated, without imposing stresses on the telescope sight, by virtue of the curved mounting bearings on the rear base member which provide pivoting at the rear mount substantially on the vertical axis of the underlying anchor screw 106'.

From the foregoing it will be understood that simultaneous adjustment in elevation and azimuth also may be made by rotating the front cone bearings through different degrees of rotation, such that the spacing between the bearings and the lateral location of the midpoint between them, are adjusted simultaneously.

It will be apparent to those skilled in the art that various changes in the arrangement of parts and in the details of construction described hereinbefore may be made without departing from the spirit of this invention and the scope of the appended claims.

Having now described my invention and the manner in which the same may be used, what I claim as new and desire to secure by Letters Patent is:

1. A mount for telescope sights comprising spaced front and rear base means adapted to be fixed to a support, front and rear clamp means associated with the corresponding base means and adapted to engage and support a telescope sight at longitudinally spaced positions along the length of the latter, connecting means on each base means and associated clamp means arranged for slidable interengagement by relative movement in a plane substantially parallel to the longitudinal axis of the base means for removably securing each clamp means to its associated base means independent of a telescope sight, and locking finger means mounted pivotally on one of the base means for movement between a locking position confining the connecting means on the associated clamp means in engagement with the connecting means on the base means and a retracted position permitting relative sliding movement of said connecting means.

2. The mount of claim 1 including auxiliary rear sight means mounted pivotally on the rear base means for rotation between an operative position and an inoperative position, resilient means interengaging said rear base means and said sight means for urging the latter normally to its operative position, said sight means being adapted and arranged to be held in its retracted position against the action of said resilient means by a telescope sight engaged in said mount.

3. The mount of claim 1 wherein the clamp means comprises a pair of substantially semi-circular ring segments adapted to encircle a telescope sight, and securing means releasably interconnecting the segments for tightening the latter about the telescope sight.

4. The mount of claim 1 wherein the clamp means comprises a split resilient ring forming an open loop adapted to encircle a telescope sight, a pair of opposed projections on the ring spaced circumferentially from the split of the ring, a pair of jaw members engaging the projections and extending toward the split of the ring, and securing means interconnecting the jaw members adjacent the split of the ring for tightening the ring about the telescope sight.

5. The mount of claim 1 for use on a gun and including means for securing the front base means to the receiver ring of the gun, and adjustable recoil absorbing abutment means on the bases means for engaging the rearward end of the gun receiver.

6. A gun mount for telescope sights comprising front and rear base means adapted to be fixed to a gun, front and rear clamp means adapted to engage and support a telescope sight at longitudinally spaced positions, connecting means on each base means and associated clamp means arranged for slidable interengagement by relative movement in a plane substantially parallel to the longitudinal axis of the base means for removably securing each clamp means to its associated base means independent of a telescope sight, at least one of said connecting means including a resilient member arranged to draw its associated clamp means into engagement with the associated base means, and locking means releasably interengaging one of the base means and associated clamp means against relative longitudinal displacement.

7. The mount of claim 6 wherein the resilient connecting means are disposed substantially within the longitudinal ends of the associated base and clamp means, whereby the space between the front and rear assemblies and underlying a telescope sight mounted thereon is substantially unobstructed.

8. The mount of claim 6, wherein the said one connecting means comprises projecting means on the base means, and a spring on the clamp means arranged to engage the projecting means whereby to seat the clamp means on the base means.

9. The mount of claim 6, wherein the said one connecting means comprises a spring on the base means, and projecting means on the clamp means arranged to releasably engage the spring means whereby to seat the clamp means on the base means.

References Cited in the file of this patent
UNITED STATES PATENTS

| | | |
|---|---|---|
| 870,272 | Burton | Nov. 5, 1907 |
| 1,613,807 | Rutherford et al. | Jan. 11, 1927 |
| 2,365,976 | Sorensen | Dec. 26, 1944 |
| 2,620,565 | Boughton | Dec. 9, 1951 |
| 2,580,246 | Schall | Dec. 25, 1951 |
| 2,743,526 | Ivy | May 1, 1956 |
| 2,790,241 | Dickenson | Apr. 30, 1957 |